Oct. 6, 1970 — R. P. WELLS ET AL — 3,531,888

RETRACTABLE FISHING ROD GIMBAL

Filed Nov. 8, 1968 — 2 Sheets-Sheet 1

INVENTOR.
RALPH P. WELLS
JOYCE L. WELLS
BY Ernest H. Schmidt
ATTORNEY.

United States Patent Office 3,531,888
Patented Oct. 6, 1970

3,531,888
RETRACTABLE FISHING ROD GIMBAL
Ralph P. Wells and Joyce L. Wells, both of 16040 SW. 102nd Ave., Miami, Fla. 33157
Filed Nov. 8, 1968, Ser. No. 774,298
Int. Cl. A01k 97/10
U.S. Cl. 43—21.2                                  9 Claims

ABSTRACT OF THE DISCLOSURE

A retractable gimbal for fishing rods is described, wherein transverse slot means are cooperatively received in a gimbal socket within which the gimbal is used for supporting and steadying the rod. The slot means includes a cylindrical member mounted in such a way as to co-axially reciprocate within the gimbal housing between inner and outer positions. When the cylindrical member is in one of these positions, it substantially closes the slot means and presents a comparatively smooth outer surface to the gimbal for positioning against the body of the fisherman in using the rod when removed from a gimbal socket.

---

Figure 1:
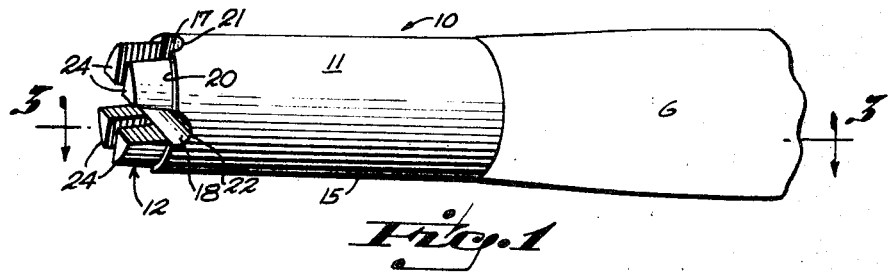

This invention relates to fishing rods, and is directed particularly to improvements in gimbals used for the support of fishing rods of the type employed in trolling and deep sea fishing.

It is common practice, particularly in deep sea fishing, to use gimbal sockets fixed with respect to a chair or to the gunwale of a fishing boat within which the gimbal at the butt or handle end of a rod can be received for pivotally supporting the rod from time to time while trolling or playing a hooked fish. Such gimbals as have heretofore been devised comprise a plurality of fixed prongs or the like providing between them a recess within which a fixed cross pin or the like in the gimbal socket is loosely received, thereby pivotally supporting the lower end of the rod to permit substantial freedom of movement while at the same time carrying most of the weight of the rod and any stresses imposed by the line being trolled, whether or not a fish has been hooked.

Such gimbal devices as have been heretofore devised, however, are deficient in that when a gimbal-equipped rod is removed from a gimbal socket, as is often required for better freedom of movement and control when a caught fish is being played close to the boat, it presents a hazard to the fisherman who will often find it necessary or convenient to prop the gimbal end of the rod against his abdomen for steadying and maintaining greater control. In such instances, the gimbal prongs, being quite small and therefore fairly sharp, will dig into the flesh, causing substantial discomfort. It is, accordingly, the principal object of this invention to provide a fishing rod gimbal of the character above-described wherein the gimbal prongs, instead of being fixed in projecting relation with respect to the handle or butt end of the rod, will be resiliently supported with respect thereto in such a manner as to automatically retract upon the application of only a slight amount of pressure against the outer end of the rod handle.

It is another object of this invention to provide a retractable fishing rod gimbal of the above nature which can readily be molded of a synthetic plastic material to achieve low cost of manufacture, and which will be attractive in appearance, light in weight, and strong, durable and foolproof in operation.

Other objects, features and advantages of the invention will be apparent from the following description when read with reference to the accompanying drawings.

Figure 2:
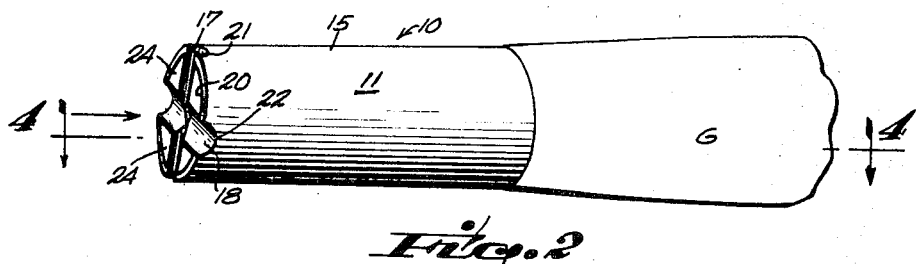
Figure 3:
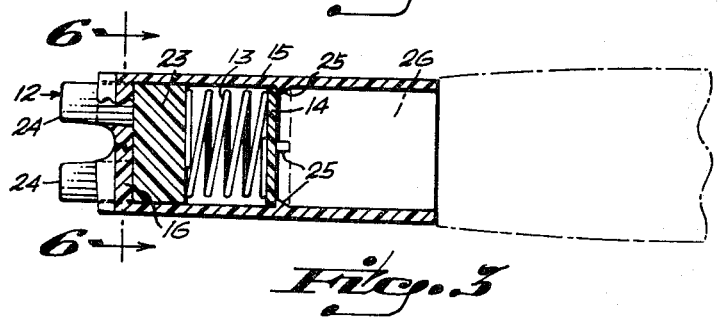
Figure 4:
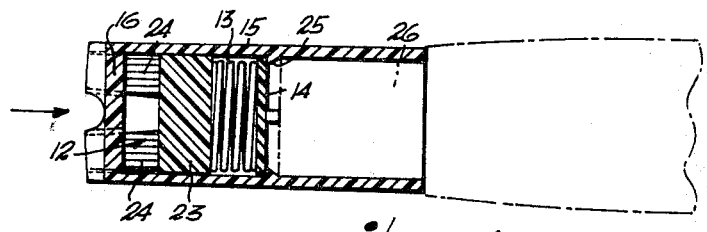
Figure 5:
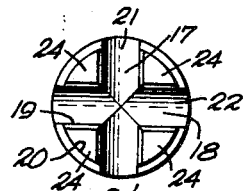
Figure 6:
Figure 7:
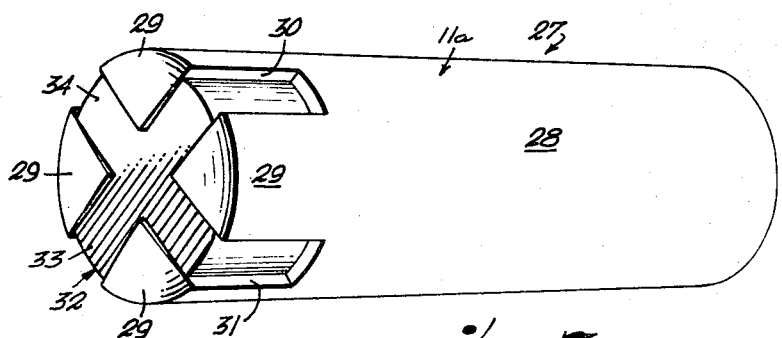
Figure 8:
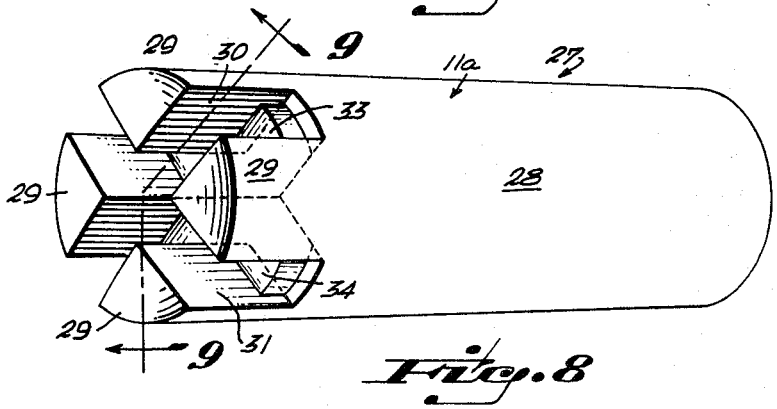
Figure 9:
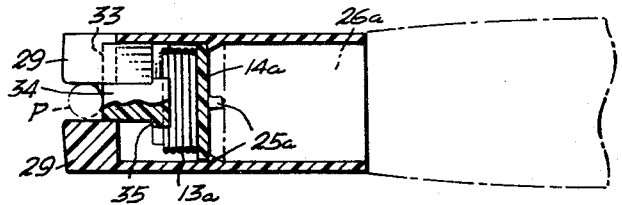
Figure 10:
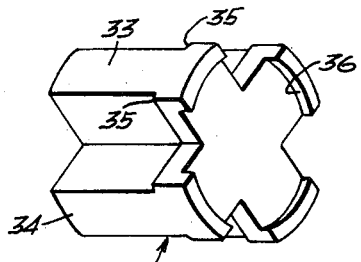

In the drawings, wherein like reference numerals denote the corresponding parts throughout the several views:

FIG. 1 illustrates, in oblique view, a retractable fishing rod gimbal embodying the invention, FIG. 2 is a view as in FIG. 1, but showing the gimbal prongs in withdrawn or retracted position, FIG. 3 is a longitudinal cross-sectional view of the retractable fishing rod gimbal, taken along the line 3—3 of FIG. 1 in the direction of the arrows, FIG. 4 is a longitudinal cross-sectional view of the retractable fishing rod gimbal, taken along the line 4—4 of FIG. 2 in the direction of the arrows, FIG. 5 is an outer end view of the retractable fishing rod gimbal, FIG. 6 is a transverse cross-sectional view taken along the line 6—6 of FIG. 3 in the direction of the arrows, FIG. 7 is an oblique view of a modified form of retractable fishing rod gimbal embodying the invention, FIG. 8 is a view similar to that of FIG. 7, but showing the piston member in retracted or withdrawn position, FIG. 9 is a longitudinal cross-sectional view taken along the broken line 9—9 of FIG. 8 in the direction of the arrows and illustrating operation of the gimbal mechanism in use, and FIG. 10 is an oblique view of the piston member of the embodiment of the invention illustrated in FIGS. 7, 8 and 9, shown separately.

Referring now in detail to the drawings, the numeral 10 in FIGS. 1 through 4 designates one form of retractable fishing rod gimbal embodying the invention, the same being comprised, generally, of a housing sleeve 11, a retractable prong member 12, a compression spring 13 and a spring abutment disc 14, all of which, with the exception of said compression spring, preferably being individually integrally molded of a tough synthetic plastic material. The housing sleeve 11 comprises a tubular side wall portion 15 formed with an outer end portion 16 comprising diagonally-extending, mutually-perpendicular web members 17 and 18. The web members 17 and 18 define equidistantly and peripherally-spaced substantially triangular through openings 19 having arcuate outer wall portions 20. The web members 17, 18 are formed, transversely along their lengths and at the outsides thereof, with arcuately concave recesses 21 and 22, respectively.

The retractable prong member 12 is formed with a cylindrical body portion 23 of such diameter as to be slidably received within the housing sleeve 11, and is formed with peripherally and equidistantly-spaced, substantially triangular prongs 24 of such size and disposition as to be complementarily slidingly received in respective ones of the housing sleeve through openings 19. As illustrated in FIGS. 1 and 3, the prong member 12 is normally yieldingly constrained in its outermost projecting position, whereat the outer side portions of the body portion 23 of the prong member 12 will abut underside portions of the housing sleeve web members 17 and 18. As illustrated in FIG. 3, the compression spring 13 is constrained between the inner wall of the body portion 23 of the prong member 12 and the circular abutment disc 14.

In assembly, the prong member 12 and the compression spring 13 will first be inserted through the open end of the housing sleeve 11, after which the abutment disc 14 will be pushed in place over the inclined wall portions of a plurality of saw tooth shaped triangular lugs 25 integrally formed in peripherally-spaced relation within said housing sleeve. It will be understood that when so assembled, the abutment disc 14 will snap into place in front of the lugs 25 and thereby be secured into position against the reactive force of the compression spring 13. The assembled retractable gimbal will be fitted over the coaxial cylindrical stud portion 26 at the outer end of a fishing rod grip G and secured in place by an appropriate cement or adhesive.

In use, upon inserting the gimbal 10 into a gimbal socket, the rod will be turned until one or the other of the diametrical grooves between the prongs 24 is in alignment with the gimbal seat cross pin (not illustrated), whereupon the rod will be locked in place for limited pivotal movement with respect to the gimbal seat. Upon removal of the rod and if it is thereafter propped against the abdomen of the fisherman, the prong member 12 will be pushed in against the reactive force of spring 13 (see FIG. 4) to provide a less sharp and therefore more comfortable abutting end of the rod while thus held and used. To this end, the outer end of the prong member 12 will be slightly convexly rounded, as illustrated in FIG. 4.

Referring now to FIGS. 7 through 10 illustrating a modified form of the invention designated, generally, by reference numeral 27, the same comprises a housing sleeve 11a having a tubular peripheral wall 28 integrally formed at one end with outwardly-extending, peripherally-spaced prong members 29, substantially triangular in cross-sectional tape, being defined by mutually perpendicular, diametrically-extending axial slots 30 and 31.

Slidably received within the tubular wall portion 28 of the housing sleeve 11a is an integrally-formed piston member 32, said piston member having mutually perpendicular, axially-extending body portions 33, 34 of such size and shape as to be slidably received within the axial slots 30, 31, respectively, of the housing sleeve 11a. The inner ends of the piston member body portions 34 are formed with increased thickness portions defining shoulders 35 adapted to abut inner end portions of the housing sleeve prong members 29 to limit outermost extending position thereof with respect to said housing sleeve to that position where it will be substantially flush with the outer ends of said prongs, as illustrated in FIG. 7.

As illustrated in FIG. 10, the inner end of the piston member 32 is formed with a circular recess 36 defining a seat for the reception of one end of a compression spring 13a, the other end of which seats against an abutment disc 14a assembled and secured in place with respect to housing sleeve 11a as described in the embodiment of the invention in FIGS. 1 through 6.

In use of the modified fishing rod gimbal illustrated in FIGS. 7 through 10, upon inserting it into a gimbal socket, the rod will be turned until one or the other of the diametrically-extending slots 30, 31 is in alignment with the gimbal seat cross pin, whereupon, the weight of the rod being greater than the reactive force of the spring 13a, the gimbal will fall into locked position (see FIG. 9), supporting the rod for limited pivotal movement with respect to the gimbal seat. Upon removal of the rod, the piston member 32 will automatically move to its outermost position, as illustrated in FIG. 7, whereat it will be substantially flush with rounded outer end portions of the outwardly-extending fingers 29 to present therewith a comparatively smooth surface which can be propped in abutting relation against the abdomen with comparative comfort.

While we have illustrated and described herein only two forms in which our invention can conveniently be embodied in practice, it is to be understood that these forms are given by way of example only and not in a limiting sense.

What we claim as new and desire to secure by Letters Patent is:

1. A retractable fishing rod gimbal comprising, in combination, a housing sleeve member, means for securing the inner end of said housing sleeve member in coaxial relation with respect to the butt end of the fishing rod, transverse slot means at the outer end of said housing sleeve member for the reception of a gimbal seat pin, said transverse slot means comprising a cylindrical member reciprocably supported in said outer end of said housing sleeve member and co-axially movable between inner and outer limit positions, said cylindrical member when in one of said limit positions being operative to substantially close said slot means and thereby present a comparatively smooth outer end surface to said gimbal.

2. A retractable fishing rod gimbal as defined in claim 1 wherein said cylindrical member comprises a plurality of prongs extending outwardly at the outer end thereof and movable through openings in the outer end of said housing sleeve member, and yieldable means normally constraining said cylidrical member in its outer limit position, said cylindrical member being operative to close said slot means when in said inner of said limit positions.

3. A retractable fishing rod gimbal as defined in claim 2 wherein said yieldable means comprises a helical compression spring constrained between the inner end of said cylindrical member and abutment means within said housing sleeve member intermediate the ends thereof.

4. A retractable fishing rod gimbal as defined in claim 3 wherein said abutment means comprises an abutment disc and a plurality of inwardly-extending lugs peripherally spaced within said housing sleeve member and operative to support peripherally-spaced marginal portions of said disc.

5. A retractable fishing rod gimbal as defined in claim 4 wherein said lugs are saw-toothed in shape with the inclined surface portions extending to the inner end of said housing sleeve member to present inclines over and beyond which peripheral edge portions of said disc can be pressed during assembly.

6. A retractable fishing rod gimbal as defined in claim 1 wherein said transverse slot means comprises a pair of transverse, diametrically-extending, mutually-perpendicular slots in the outer end of said sleeve member, said cylindrical member comprising mutually perpendicular body portions complementarily received within said transverse slots, and yieldable means normally constraining said cylindrical member in its outer limit position, whereat it is operative to close said slot means.

7. A retractable fishing rod gimbal as defined in claim 6 wherein said yieldable means comprises a helical compression spring constrained between the inner end of said cylindrical member and abutment means within said housing sleeve member intermediate the ends thereof.

8. A retractable fishing rod gimbal as defined in claim 7 wherein said abutment means comprises an abutment disc and a plurality of inwardly-extending lugs peripherally spaced within said housing sleeve member and operative to support peripherally spaced, marginal portions of said disc.

9. A retractable fishing rod gimbal as defined in claim 8 wherein said lugs are saw-toothed in shape with the inclined surface portions extending to the inner end of said housing sleeve member to present inclines over and beyond which peripheral edge portions of said disc can be pressed during assembly.

References Cited
UNITED STATES PATENTS

| | | | |
|---|---|---|---|
| 1,451,732 | 4/1923 | Hipwood. | |
| 1,720,982 | 7/1929 | Van Brunt. | |
| 2,360,402 | 10/1944 | Determan | 43—21.2 |
| 2,528,799 | 11/1950 | Strong | 43—25 X |
| 3,287,844 | 11/1966 | Hoxter | 43—23 X |
| 3,443,335 | 5/1969 | Guydos | 43—23 X |

ALDRICH F. MEDBERY, Primary Examiner

J. H. CZERWONKY, Assistant Examiner

U.S. Cl. X.R.

43—23